March 2, 1943. R. M. JOYCE 2,312,557
METHOD FOR ESTABLISHING THE MOISTURE CONTENT OF GINNED COTTON
Filed June 27, 1940 2 Sheets-Sheet 1
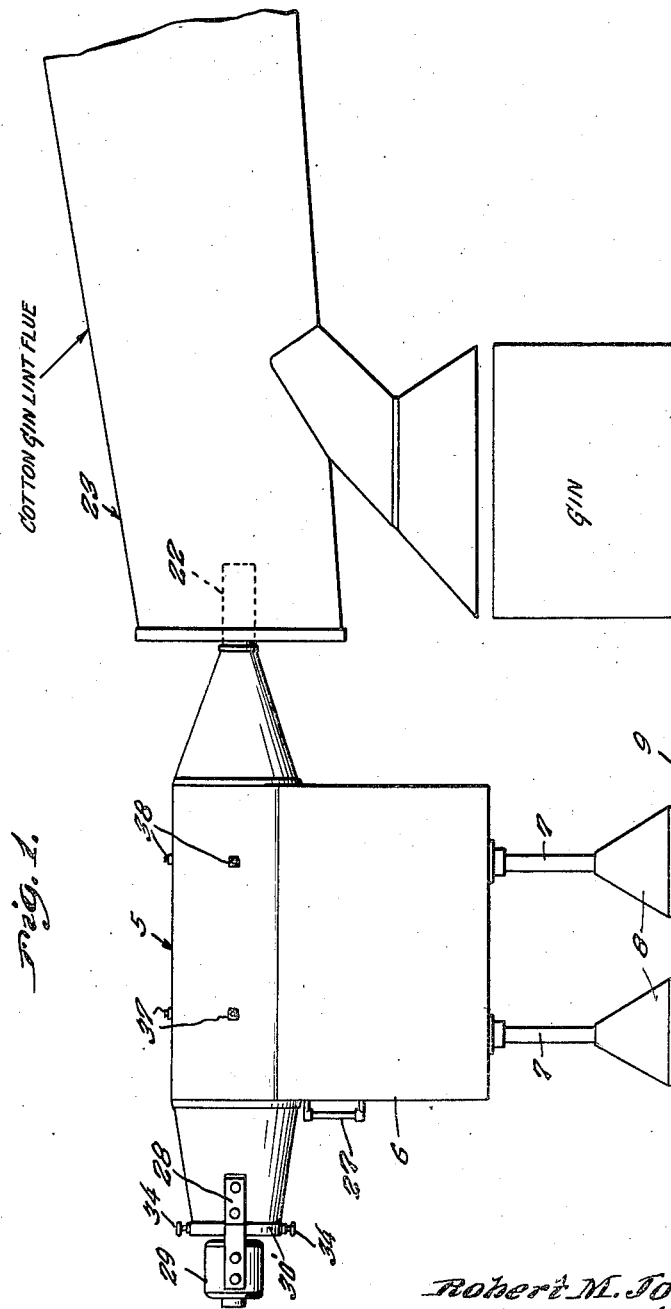
Inventor
Robert M. Joyce
By Clarence A. O'Brien
Attorney

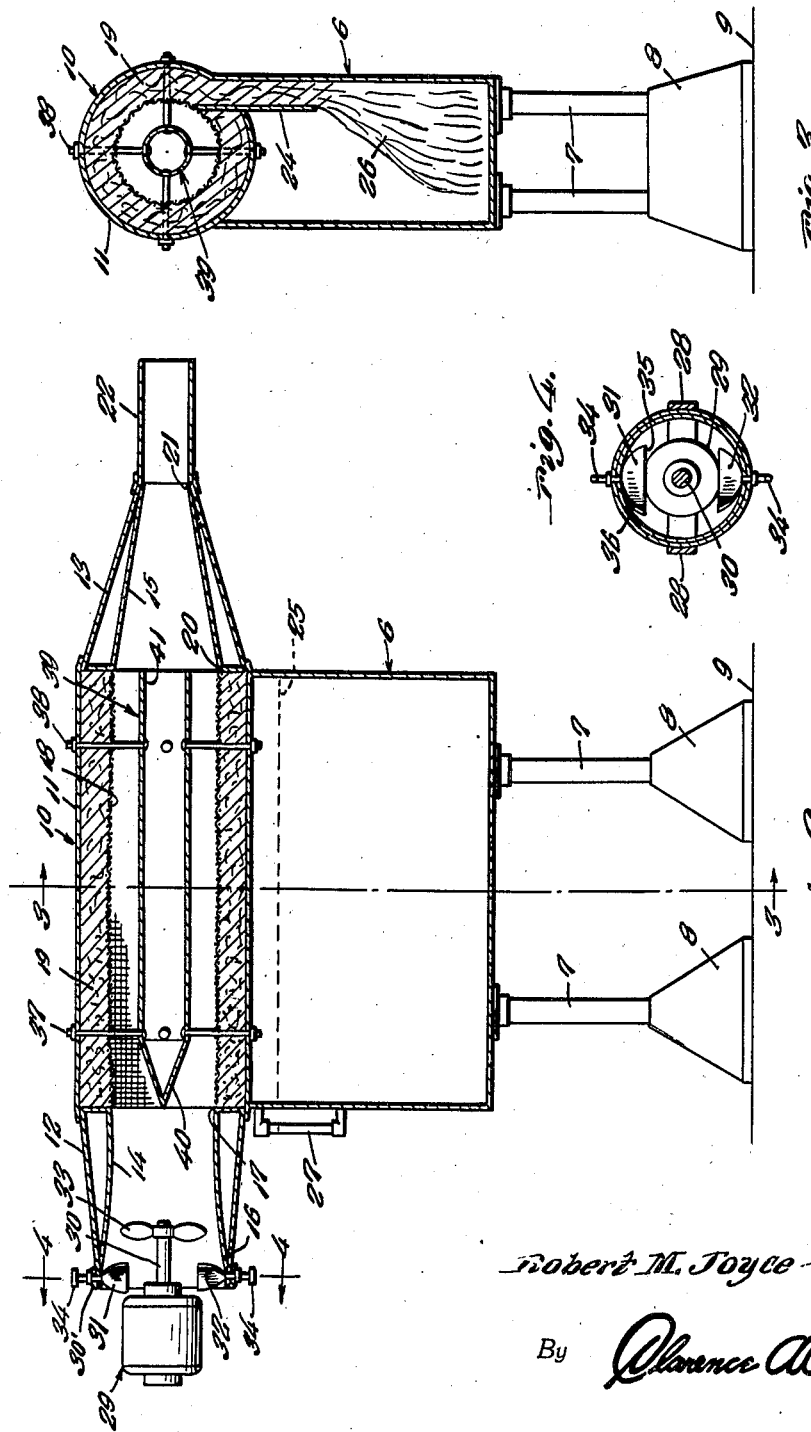

Patented Mar. 2, 1943

2,312,557

UNITED STATES PATENT OFFICE 2,312,557

METHOD FOR ESTABLISHING THE MOISTURE CONTENT OF GINNED COTTON

Robert M. Joyce, Greenville, Miss.

Application June 27, 1940, Serial No. 342,832

1 Claim. (Cl. 19—66)

My invention relates to method and means for establishing a predetermined moisture content in ginned cotton, and an important object of the invention is to enable cheaply and easily eliminating the disadvantages inherent in the handling, marketing, and processing of cotton having varying moisture contents, by controllably adding the proper degree of moisture through the lint flue of the gin as the cotton is ginned therein.

Another important object of my invention is to provide a simple and efficient apparatus for producing and injecting the correct degree of moisture into the lint flue of the gin during the operation of the gin.

Other important objects and advantages of my invention will be apparent from a reading of the following description taken in connection with the drawings, wherein a preferred embodiment of my invention is shown.

In the drawings:

Figure 1 is a general side elevational view showing the moisture producing device assembled with respect to the lint flue of the cotton gin.

Figure 2 is an enlarged longitudinal vertical sectional view taken approximately centrally through the moistening device.

Figure 3 is a transverse vertical sectional view taken through Figure 2 approximately on the line 3—3 and looking toward the right in the direction of the arrows.

Figure 4 is a transverse vertical sectional view taken through Figure 2 approximately on the line 4—4 and looking toward the left in the direction of the arrows, and showing the valves or dampers in partly open positions.

In working cotton into bales for market, the cotton is commonly subjected to a drying operation, followed by ginning and wrapping into bales. During this series of operations or thereafter, should the cotton have a natural moisture content less than that of the surrounding atmosphere, the cotton will absorb moisture from the surrounding atmosphere up to the moisture content of the said atmosphere. Further, in so absorbing moisture from the surrounding atmosphere, the degree of absorption varies through the bales, as to depth, and in accordance with exposure of the bales to the atmosphere, so that the moisture content of the bales is extremely variable and un-uniform. Due to the gained weight which accompanies this absorption of moisture from the surrounding atmosphere, there is established a direct loss to the producer and ginner, and an unearned gain on the part of the cotton buyer because it reflects a loss of weight in the wrapped cotton and a corresponding reduction in weight of the cotton, for which loss there is no established compensation to the producer and ginner. By predetermining and establishing the moisture content of the cotton in accordance with the present invention, this loss to the producer and ginner is eliminated.

Kinking, curling, and brittleness, characteristic of cotton which has been subjected to excessive heat or drying out during the drying and ginning operations, and which causes loss in the mills in manufacturing the cotton, besides presenting other technical difficulties, is substantially entirely eliminated by controlling the moisture content of the cotton in accordance with the present invention as hereinafter pointed out.

This dry, spongy condition in cotton presents problems in pressing bales at gins as well as in repressing them at compresses. Frequently, bales have to be repressed at the gins, and 2 or 3 ties added, because expansion of the bales associated with the dry and spongy condition of the cotton causes bale ties to snap off. Also compresses, in some instances, have to use more than the customary number of ties to hold the bales intact. It is not unusual for as many as 11 or 12 ties to be placed on high density bales when these conditions are encountered.

The method of the present invention consists of applying moisture to the cotton after ginning of the cotton and before wrapping the cotton into bales.

Suitable apparatus for carrying out this method is shown by reference in detail to the drawings, wherein the numeral 5 generally designates the moisture producing and controlling apparatus consisting of a generally rectangular relatively narrow casing 6 supported on legs 7 rising from suitable anchors 8 resting on or connected to the floor 9. A horizontal cylinder 10 is formed as a part or secured to the upper end of the casing 6 as clearly indicated in Figures 2 and 3 and is of approximately the same length as the casing 6 as to the uniform diameter portion 11 thereof. The cylinder has tapered ends 12 and 13 which have restricted throats 14 and 15, respectively.

The throat 14 is enlarged at its entrance end as indicated by the numeral 16 and curvedly tapered to its exit end 17 to produce a Venturi action upon the passage of the air into the uniform diameter portion of the cylinder 11 whose bore 18 is defined by wire screen material which has packed between it and the walls of the uniform diameter portion 11 of the said cylinder suitable wick material 19. The discharge end 17 of the throat 14 is of substantially the diameter of the bore 18.

The throat 15 has its entrance end 20 of substantially the same size as the bore 18, the throat 15 being substantially uniformly tapered toward its discharge end 21 to provide a Venturi action on the air coming through the cylinder, the throat end 21 being connected to a nozzle 22 which enters the end of the cotton gin lint flue which is generally designated 23, and extends therein as indicated in dotted lines in Figure 1 for a suitable distance.

One side of the lower part of the cylinder portion 11 is cut away and provided with a vertical baffle 24 which is tangential with respect to the screen 18 as indicated in Figure 3, and the wick material 19 is brought down between this vertical baffle and the adjacent side wall of the casing 6. Water to the level indicated by the line 25 is maintained in the casing 6 so as to cover the expanded portion 26 of the wick 19, whereby the wick 19 is kept constantly moistened at a uniform rate and to a uniform degree and so that the air as it passes through the cylinder 10 will pick up moisture in finely divided form. A liquid level gauge 27 may be conveniently placed on one end of the casing 6 as indicated in Figure 2.

Brackets 28 attached to the outer side of the tapered end portion 12 of the cylinder 10 mount an electric fan motor 29 with its shaft 30 aligned with the axis of the cylinder 11 and extending into the throat 14 as indicated in Figure 2. A reinforcing annulus 30' on the entrance end of the portion 12 of the cylinder provides adequate support for the rotatable dampers or valves 31 and 32 which are placed at the top and bottom of the entrance end of the throat 14 and behind the fan 33 which is fixed on the end of the motor shaft 30. The dampers are mounted on suitable shafts journaled in the annulus 30' and have adjusting handles 34 which are in substantial axial vertical alignment as shown in Figure 4. The valves or dampers are vertically spaced from each other, their horizontal parallel edges 35 being substantially spaced on opposite sides of the motor shaft 30, with the radially outward edges 36 shaped to conform to the interior of the throat. In this way with the valves turned to a position exactly transverse of the throat 14 they exert the full capacity thereof in reducing the entrance of air into the throat 14, whereas if these valves or one of them be turned at an angle, correspondingly more air is allowed to enter the throat 14 and be drawn thereinto by the fan 33.

The longitudinally spaced sets of bolts 37 and 28, respectively, which support and retain the wick 19 and the screen 18 in place are extended radially inwardly beyond the screen 18 to afford support for the deflector which is generally designated 39 and which is coaxially arranged within the cylinder 10 in substantially spaced relation to the screen 18. The deflector 39 is substantially uniform in diameter except for the conical end 40 which faces the fan 33 at the left hand end of the bore 18. The opposite end of the deflector may be open as indicated by the numeral 41, if desired. The effect of the deflector 39 is to more evenly and forcibly direct the air produced by the fan 33 into contact with the moisture containing wick and thereby more thoroughly saturate the air for transmission through the nozzle 22 to the interior of the cotton gin lint flue for imparting the desired moisture content to the cotton therein. The Venturi action produced by the movement of the moisture laden air through the tapered mouth 15 consolidates and makes more even the distribution and packing of the moisture in the air on its way to the lint flue.

Although I have shown and described herein preferred embodiments of this method and apparatus of the present invention, it is to be presently understood that I do not desire to limit the application of the invention thereto, except as may be required by the scope of the subjoined claim.

A method of establishing a predetermined moisture content in baled cotton, said method consisting in subjecting the cotton after ginning to air having a predetermined moisture content by blowing air into contact with a source of moisture to mix with such air moisture in finely divided form and conveying the resultant moisture laden air into the stream of cotton in the lint flue concurrent with the stream of cotton as the cotton emerges from the gin, and then baling the cotton.

ROBERT M. JOYCE.